United States Patent
Pedron et al.

(10) Patent No.: US 7,756,731 B2
(45) Date of Patent: Jul. 13, 2010

(54) SYSTEM FOR MANAGING TRAVEL VOUCHERS AND METHOD OF SAME

(75) Inventors: Emmanuelle Pedron, Antiles (FR); Xavier Lagardere, Monqus-Santanx (FR); Vincent Coquel, Sartoux (FR)

(73) Assignee: Amadeus S.A.S., Biot (FR)

( * ) Notice: Subject to any disclaimer, the term of this patent is extended or adjusted under 35 U.S.C. 154(b) by 574 days.

(21) Appl. No.: 11/504,047

(22) Filed: Aug. 15, 2006

(65) Prior Publication Data
US 2008/0077453 A1 Mar. 27, 2008

(51) Int. Cl.
G06Q 10/00 (2006.01)
G06Q 30/00 (2006.01)
G01C 21/34 (2006.01)

(52) U.S. Cl. .................. 705/5; 705/6; 705/14
(58) Field of Classification Search .......... 705/5–6, 705/14
See application file for complete search history.

(56) References Cited

U.S. PATENT DOCUMENTS

| | | | | |
|---|---|---|---|---|
| 5,010,485 | A * | 4/1991 | Bigari | 705/17 |
| 6,058,371 | A * | 5/2000 | Djian | 705/14 |
| 7,113,929 | B1 * | 9/2006 | Beach et al. | 705/65 |
| 2003/0177044 | A1 * | 9/2003 | Sokel et al. | 705/5 |
| 2004/0073487 | A1 * | 4/2004 | Powell et al. | 705/14 |
| 2004/0138930 | A1 * | 7/2004 | Barnes et al. | 705/5 |
| 2005/0125267 | A1 * | 6/2005 | Bramnick et al. | 705/5 |
| 2005/0165628 | A1 * | 7/2005 | Vaaben et al. | 705/5 |
| 2005/0177402 | A1 | 8/2005 | Walker et al. | 705/5 |
| 2007/0290031 | A1 * | 12/2007 | Singh | 235/375 |

FOREIGN PATENT DOCUMENTS

| | | |
|---|---|---|
| AU | 2002341173 A8 | 11/2002 |
| EP | 1229456 | 8/1992 |
| JP | 2001118152 A * | 4/2001 |
| WO | WO 02/103573 | 12/2002 |

OTHER PUBLICATIONS

PCT Search Report.

* cited by examiner

*Primary Examiner*—John W Hayes
*Assistant Examiner*—Fadey S Jabr
(74) *Attorney, Agent, or Firm*—Steptoe & Johnson LLP

(57) ABSTRACT

An on-line voucher management system which provides a user interface for travel agents, carriers and online customers to create and redeem vouchers is provided. The on-line portal has access to the GDS which stores PNRs. The voucher will be created as a standard PNR containing a fictitious air itinerary and its associated ticket data. Users specify the voucher amount and other required information through the user interface, and a PNR holding that information is created in the GDS. The PNR is then ticketed as for a standard booking process. Then voucher redemption is managed as a typical PNR reissue process.

30 Claims, 3 Drawing Sheets

SYSTEM FOR MANAGING TRAVEL VOUCHERS AND METHOD OF SAME

BACKGROUND OF THE INVENTION

1. Field of the Invention

The present invention is directed to an integrated system for vouchers management. More specifically, the present invention is directed to an integrated system in which vouchers are established as a fictitious passenger name record (hereinafter "PNR") within the carrier's existing PNR system, and redeemable through typical PNR reissue methodology.

2. Discussion of Background Information

Typical modern travel booking systems utilize a passenger name record system. A PNR is a file on a global distribution system (hereinafter "GDS") containing the information relating to a specific booking. A GDS is a computer reservation system, typically owned jointly by airlines in different countries, that includes reservation databases of suppliers in many countries.

Carriers often find themselves in situations in which it is necessary or at least prudent to offer a customer a credit, refund the purchase price of a ticket, or offer other compensation to travelers. Non-limiting examples of situations include an unused ticket, cancelled flight, lost luggage, being bumped from a flight, voluntarily surrendering a seat on an overbooked flight, special promotions, or a user simply deciding to cancel a trip for a refundable ticket. Such compensation is typically given to the customer either as a pure refund or as a credit voucher to be redeemed by the customer for alternative travel or other expenses. A voucher is preferable to a refund, as a customer may spend the refund anywhere whereas a voucher is generally redeemable only through the carrier or authorized affiliates.

Managing vouchers is a costly process. The creation is usually not integrated into the carrier's systems for payment, billing, booking and/or reporting. The redemption cannot be performed through all available sales channel and usually requires calling a company agent who manually creates a PNR. The redemption process is complex as the carrier needs to identify in the new booking the fact that at least part of the amount was paid by a voucher, along with the corresponding amount, including taxes. The airline must also maintain a reporting system to account for vouchers being redeemed. Voucher creation and management flows are therefore difficult to manage through the online sales channel. This is an issue both in terms of customer exposure and cost management.

Some airlines offer voucher creation and redemption online through a separate database system. The payment process is an external payment, such that the airline needs to have some additional reporting mechanism to identify that a voucher has been created with a specific amount. For the creation process, there needs to be a specific database containing all information relative to the person the voucher is for, the specific amount and the expiration date. This information ideally needs to be visible by the call-centers who may not have access to that database. Once the voucher is created, there needs to be a mechanism in place to debit the amount. When the customer redeems the voucher, the new booking contains a reference to the voucher and corresponding amount. Again, this requires the carrier to have an independent mechanism in place to correlate both the voucher and new booking and report on the same.

SUMMARY

Embodiments of the present invention are directed to a vouchers management system and methodology that integrates voucher creation and redemption flows into the airlines standard PNR management system. Unused tickets offer an airline the opportunity to avoid refunding a ticket by transforming an existing PNR into a voucher. The system and method may also allow the creation of gift vouchers for online customers to use as a present for someone else, or as compensation vouchers issued by the carrier.

According to an embodiment of the invention, a method for issuing vouchers is provided. A plurality of actual passenger name records are stored in a global distribution system, each actual passenger name record including at least identification data and travel related data. A fictitious passenger name record is created that includes at least identification data, fictitious travel related data, and a value. The fictitious passenger name record is stored in the global distribution system. Travel arrangements are received having a cost associated therewith. The fictitious passenger name record is converted into an actual passenger name record. The conversion includes at least crediting at least a portion of the value against at least a portion of the cost. The converted actual passenger name record is stored in the global distribution system.

The above embodiment may have various optional features. The converting can be prevented if the at least a portion of the value exceeds the at least a portion of the cost. An actual passenger name record can be from the global distribution system and modified into the fictitious passenger name record. Portions of the selected actual passenger name record corresponding to used travel associated with the selected actual passenger name record can be cancelled, while the value is set based on unused travel associated with the selected actual passenger name record. An actual passenger name record can be selected from the global distribution system, and the fictitious passenger name generated based at least partially on information from the selected actual passenger name record. The value can be selected by a user to represent a gift amount, or as compensation set by the carrier. The fictitious passenger name record and the actual passenger name records can have the same database format. A ticket can be issued based on the new passenger name record.

According to another embodiment of the invention, a method for issuing vouchers is provided. Real travel records are stored in a database network, each travel record having associated therewith at least identification data and travel related data. A fictitious travel record is created has associated therewith at least identification data, fictitious travel related data, and a value. The fictitious travel record is stored in the database network. Travel arrangements having a cost associated therewith are received. The fictitious passenger name record is converted into a real travel record, the conversion including at least crediting at least a portion of the value against at least a portion of the cost. The converted real travel record in stored in the common database. The fictitious travel record and the actual travel records have the same database format.

The above embodiment may have various option features. The converting can be prevented if the at least a portion of the value exceeds the at least a portion of the cost. An actual personal travel record can be selected from the global distribution system and modified into the fictitious personal travel record. The conversion may include canceling portions of the selected actual personal travel record corresponding to used travel associated with the selected actual personal travel record, and setting the value based on unused travel associated with the selected actual personal travel record. The creation may include selecting an actual personal travel record from the global distribution system, and generating the fictitious passenger name based at least partially on information from the selected actual personal travel record. The value may be selected by a user to represent a gift amount, or by the carrier as a compensation amount. The fictitious personal travel records and the real travel records may be accessible by the same on-line portal. A ticket can be issued based on the new passenger name record.

According to yet another embodiment of the invention, a method for issuing vouchers is provided. The method includes the steps of storing a plurality of actual passenger name records in a global distribution system, each actual passenger name record including at least identification data and travel related data; creating a fictitious passenger name record that includes at least identification data, fictitious travel related data, and a value; designating the fictitious passenger name record as a redeemable asset; storing the fictitious passenger name record in the global distribution system; wherein the fictitious travel record has the same database format as the actual travel records.

The above embodiment may include various optional features. The creating may further include selecting an actual passenger name record from the global distribution system, and generating the fictitious passenger name based at least partially on information from the selected actual passenger name record. The value may be selected by a user to represent a gift amount, or by the carrier as a compensation amount.

According to still yet another embodiment, a method of redeeming a travel vouchers is provided. The steps include retrieving a fictitious passenger name record from a global distribution system, the fictitious passenger name record including at least identification data, fictitious travel related data, and a value; receiving travel arrangements having a cost associated therewith; converting the fictitious passenger name record into an actual passenger name record, the converting including at least crediting at least a portion of the value against at least a portion of the cost; and storing the converted actual passenger name record in the global distribution system.

The above embodiment may include various optional features. The converting can be prevented if the at least a portion of the value exceeds the at least a portion of the cost. The creating may include selecting an actual passenger name record from the global distribution system, and modifying the selected actual passenger name record into the fictitious passenger name record. The converting may also include canceling portions of the selected actual passenger name record corresponding to used travel associated with the selected actual passenger name record, and setting the value based on unused travel associated with the selected actual passenger name record. The creating may include selecting an actual passenger name record from the global distribution system, and generating the fictitious passenger name based at least partially on information from the selected actual passenger name record. The value may be selected by a user to represent a gift amount, or by the carrier as a compensation amount. The fictitious passenger name record and the actual passenger name record may have the same database format. A ticket can be issued based on the new passenger name record.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

For purposes of simplicity, discussions herein refer to airline travel application, although the invention may apply to any form of travel and/or booking system.

An embodiment of the present invention is directed to an on-line voucher management system which provides a user interface for travel agents, carriers and online customers to create and redeem vouchers. The on-line portal has access to the GDS which stores PNRs. The voucher will be created as a standard PNR containing a fictitious air itinerary and its associated ticket data. Users specify the voucher amount and other required information through the user interface, and a PNR holding that information is created in the GDS. The PNR is then ticketed as for a standard booking process. Then voucher redemption is managed as a typical PNR reissue process.

Figure 1:
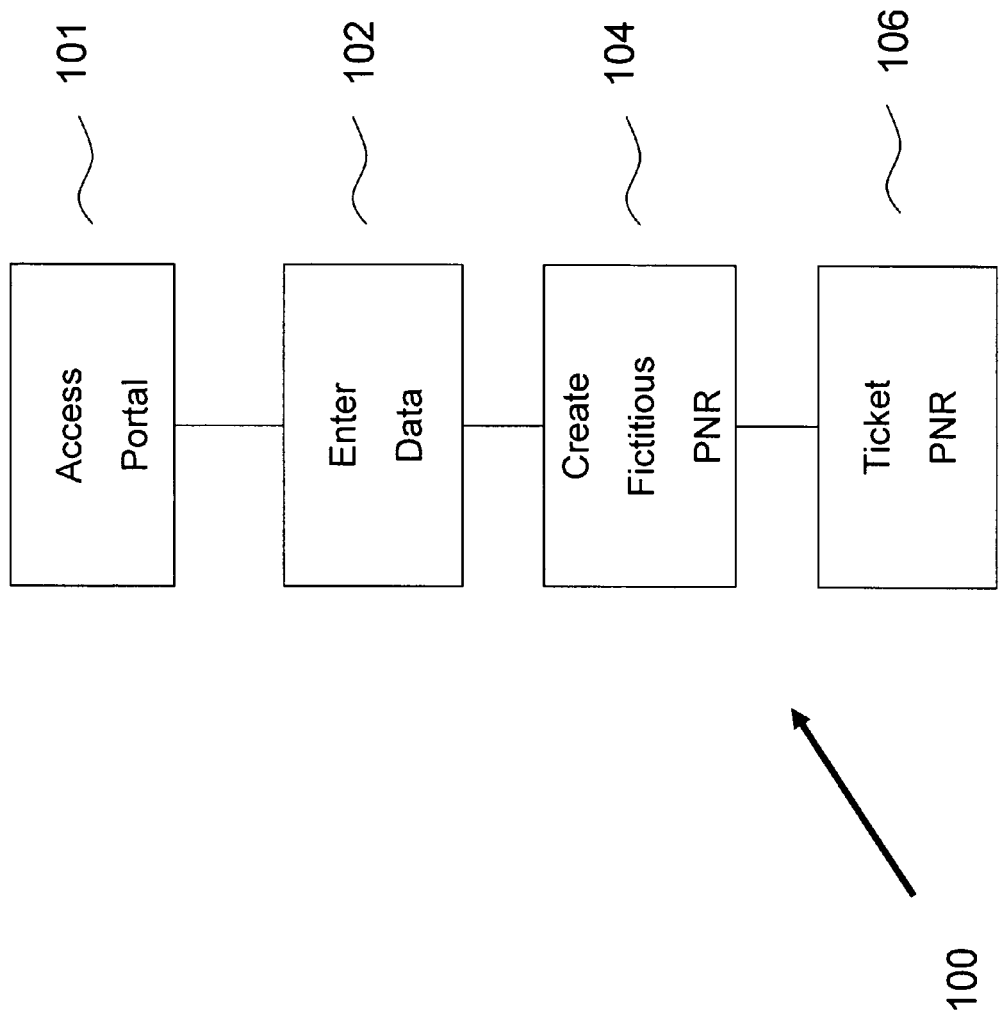
FIG. 1 illustrates a process flow for issuing a gift or compensation voucher according to an embodiment of the invention.

Referring now to FIG. 1, a voucher creation process as a gift or credit is shown generally at 100. At step S101, the user accesses an appropriate web page through a standard Internet browser, although any portal or network access could be used. Fields will be presented to receive at least a voucher amount and the identity of the person the voucher is for at step S102. The voucher amount is preferably a monetary amount, but could be other forms of exchangeable compensation such as frequent traveler miles. It may be or reflect a standard pricing on fare quote or a transitional stored ticket record ("TST") created manually. The identity of the person is preferably a name, but could be other forms of information, such as social security number, other ID code, and/or credit card number. Additional fields many also be presented to receive other types of information as may be desirable.

Once the appropriate data is entered, the system creates a fictitious PNR at step S104. The fictitious PNR preferably has the same data format as real/actual PNRs stored in the GDS, and thus will be processed and handled in the same way and using the same booking system via standard booking reservation processing. The fictitious PNR preferably includes the identity of the person to whom the voucher is issued, the credit card of the person who creates the voucher, the voucher amount, and a fictitious itinerary pre-defined by the airline. The fictitious itinerary is for travel arrangements that do not exist, such as a non-existent flight between two cities scheduled for some future date. The expiration date of the voucher is configurable and is reflected in the itinerary part of the PNR via a standard booking process. A data field that represents the status of the ticket (e.g., refundable, transferable, etc.) is set to indicate that the voucher is fully or partially redeemable for another ticket, product and/or service. Any price transformation, such as the application of fees, can be performed on the initially specified amount.

The voucher amount reflected in the PNR can be issued from a standard pricing command on the fictitious itinerary, as the airline would likely have filed the fares associated to that itinerary in the GDS. A TST is created automatically containing the voucher amount as base fare and additional taxes when applicable. In the alternative, the TST can be created manually to reflect the voucher amount.

At the end of the creation process at step S106, a PNR has been created with all necessary information for ticketing. The PNR is then ticketed and the credit card of the person creating the voucher is debited, although the amount is typically nominal. At this point the voucher is redeemable against future expenditures with the airline, and the user can redeem the voucher in the same manner as a ticket for a redeemable flight.

Figure 2:
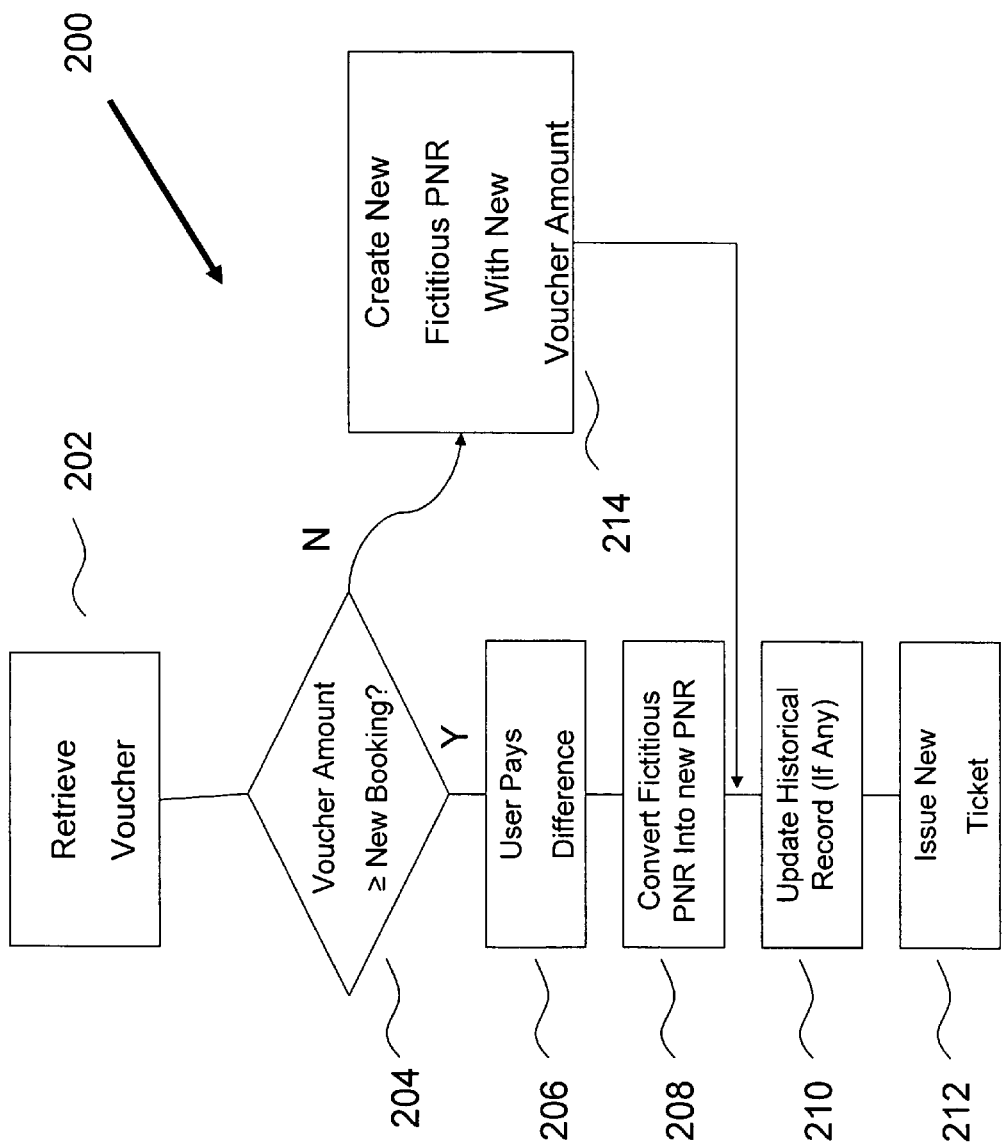
FIG. 2 illustrates a process flow for redeeming a voucher.

The voucher reissue process flow of the embodiment tracks whatever PNR based reissue process the carrier provides for redeeming a ticket and reissuing a new one. Referring now to FIG. 2, a non-limiting example of a voucher redemption process is shown generally at 200. Since vouchers are created and exist as standard PNRs, they can be retrieved directly with a PNR record locator from a GDS. At step S202, the user calls up the fictitious PNR and/or voucher related data using a record locator, such as a voucher identification code that is specific to the user and/or the voucher. At step S204, the system determines whether the voucher amount is less than or equal to the cost of the new booking. If so, then at step S206, the user is prompted to pay for the difference by appropriate method, e.g., credit card.

A PNR management system will have in place a methodology for converting a redeemable PNR for a redeemable asset into a new PNR for a new itinerary. By way of non-limiting example, the original/redeemable PNR is modified into a new/reissued PNR, either by changing the underlying data fields of the fictitious PNR, or importing some of the data from the fictitious PNR into a new/reissued PNR to reflect the new itinerary. An embodiment of the present invention is compatible with any such PNR methodology, in that the fictitious PNR can be redeemed and reissued using the same procedures. Thus, the voucher redemption can seamlessly be integrated in the PNR management system.

Thus, at step S208, the fictitious PNR is converted to a new reissued PNR using whatever methodology that the PNR management system applies for its reissue processing. At step S210, the historical record of the PNR (to the extent one is maintained, either as part of or related to the PNR) is updated to reflect the redemption of the voucher. Note that steps 208 and 210 could also be reversed or combined into a single step. At step S212, a new ticket can be issued from the newly created actual PNR.

In an alternative embodiment, the fictitious PNR is closed out, and a new PNR is created for the new itinerary to reflect the new booking. In another alternative, the existing PNR system could be modified to independently account for/process the vouchers.

If at step S204 the system determines that the voucher amount is greater than the cost of the new booking, then at step S214 the system deducts the difference to arrive at a new voucher amount. At step S214, a new fictitious PNR is created, either by modifying the prior fictitious PNR to reflect the new voucher amount, or by creating a new fictitious PNR with the new voucher amount and closing out the prior one. Control then returns to step S210 discussed above.

An alternative "price-to-reach" redemption process limits redemption of vouchers to new itineraries where the new booking amount exceeds or is equal to the voucher amount. Under this methodology, the carrier will not have to issue refunds or new fictitious PNRs for residual amounts. The process flow is the same as FIG. 2, except that at step S214 the user is informed that the new booking amount is insufficient. Control would proceed back to step S202 for a new itinerary, or a sub-process could be evoked in which the user is given the option to make additional bookings and/or purchases to reach the voucher amount. This price-to-reach feature allows the carrier to guarantee itself an additional source of revenue with no additional cost, because the revenues which were previously lost to refund will now stay with the carrier.

Figure 3:
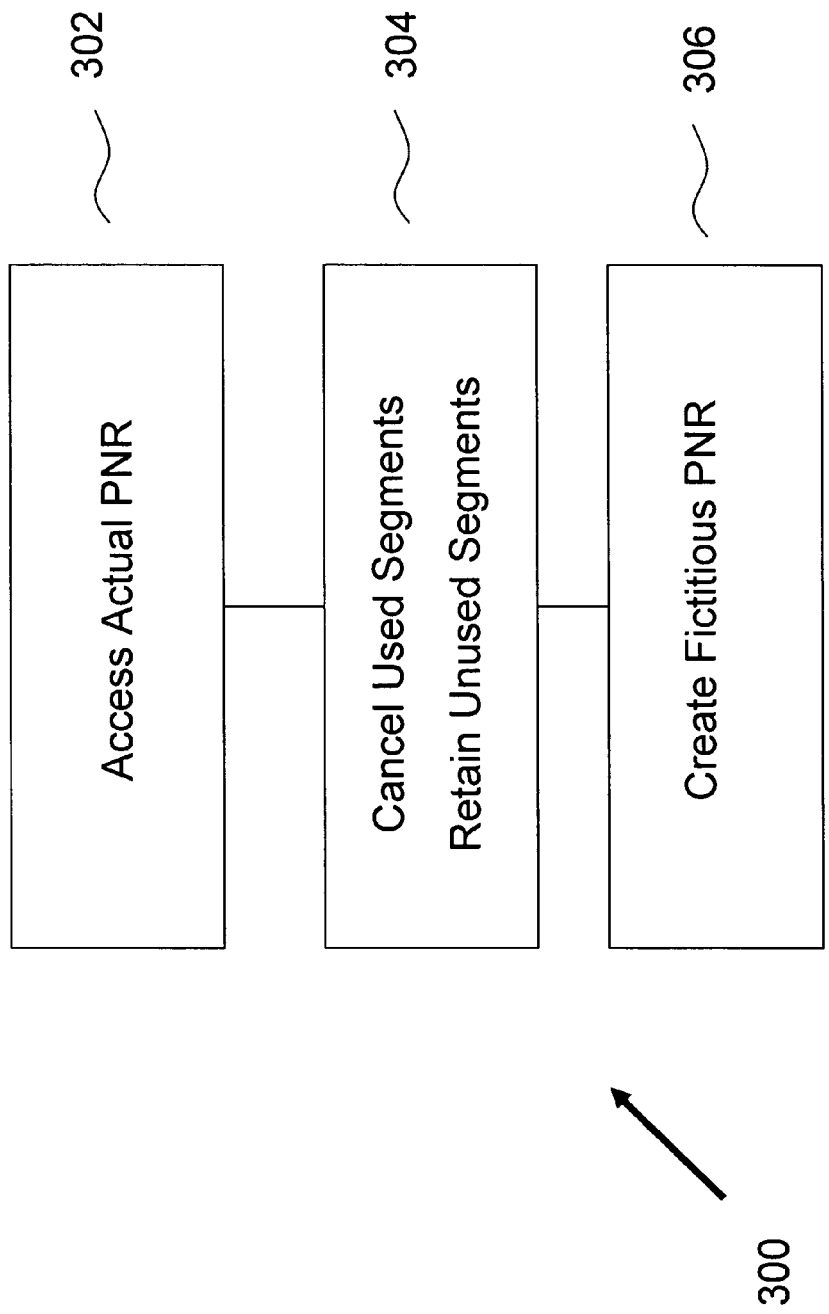
FIG. 3 illustrates a process flow for converting an unused ticket into a voucher.

Referring now to FIG. 3, a voucher creation process based on an unused ticket is shown generally at 300. At step S302, a user access the PNR for the unused ticket in the GDS using a standard browser. At step S304, any non-flown segments associated with the PNR are cancelled from the PNR, while flown segments are retained. At step S306, a fictitious PNR is generated with a fictitious itinerary, either by modifying the existing PNR, by creating a new PNR (from scratch or by importing data from the existing PNR) and closing the prior one. The voucher amount in the fictitious PNR can be a full or partial credit of the amount due under the flown segments. All previous tax information is preferably held in the voucher and can be accounted for at redemption time through the reissue process. The voucher can be redeemed through the methodology discussed with respect to FIG. 2.

The above embodiments present many advantages over prior art voucher systems. By using a carrier's standard mechanism for PNR management, ticket issue and reissue, and backend systems for billing and reporting, there are no cost expenditures with maintaining a parallel system for creating and accounting vouchers. Storing the fictitious PNRs in the GDS allows for voucher storage and maintenance without additional cost to the carrier. Using the PNR format and PNR reissue procedure to process vouchers reduces the need to train personnel on the operation of an independent system, and for which the reporting and accounting system is already in place.

The vouchers management system also makes it possible for an airline to support vouchers creation and redemption through its online sales channel. Thus, vouchers can be created and redeemed through the same systems used to book travel.

By design, the voucher management system can be used as an online rebooking engine. Indeed, the carrier can choose to hide the voucher creation/redemption flow to the end-user to simulate an itinerary rebooking mechanism.

The above methodology can be designed as software using known methods of programming for incorporation into a PNR's existing hardware/software network.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

For example, the sequence of steps shown in the figures and described herein are exemplary only. It is well within the skill of the art to modify sequencing, add and/or remove steps to accomplish the methods as recited in the appended claims.

The vouchers should be accessible through whatever means that the carrier(s) make PNR's available. For example, the carrier may access them through its Intranet or network according to its standard practice. Customers, travel agents or other carriers could access it through the Internet, Intranet, or other dedicated system. The invention is not limited to any specific system.

The user as described herein may be any authorized individual, whether that be a carrier, travel agent, or individual customer. The user may also be a proxy on behalf of another, such as a travel agent making a booking for a client, or a person buying a gift for another. The PNR preferably includes identikit information (e.g. the name) of the party for whom the travel is redeemable, e.g., the gift receiver or traveler, but it may also include identity information of the proxy.

The embodiments herein, to the extent described as "typical" applications, refer to any particular system, application or portion thereof which carriers or others use for billings and/or bookings choose to use. It does not refer to any specific application or system in use, but rather any such system as in use, has been used, or may be used in the future. Thus, by way of example, the present invention is not limited to any particular PNR reissue processing methodology, regardless of whether in use today or as may come into use in the future.

The invention is not limited to the various data elements discussed herein, or any specific location of such data. Seamless compatibility with the carrier's billing and reporting systems is preferably to rigidity in a specific PNR structure. Thus, by way of non-limiting example, if a carrier includes price, costs or value in a file related to the PNR (e.g., ticket or TST) but not the PNR itself, then the value of voucher would similarly be maintained in such file related to the fictitious PNR.

What is claimed is:

1. A method for issuing vouchers, comprising:
    storing a plurality of actual passenger name records in a tangible computer readable medium portion of a global distribution system, each actual passenger name record including at least identification data and travel related data;
    creating, via software operating on an electronic computer hardware platform, a fictitious passenger name record that includes at least identification data, fictitious travel related data, and a value, said fictitious travel related data representing at least in part false travel arrangements that do not exist;
    storing the fictitious passenger name record in a tangible computer readable medium portion of the global distribution system;
    receiving travel arrangements having a cost associated therewith;
    converting the fictitious passenger name record into an actual passenger name record, said converting including at least crediting at least a portion of said value against at least a portion of the cost; and
    storing the converted actual passenger name record in a tangible computer readable medium portion of the global distribution system.

2. The method of claim 1, further comprising preventing said converting if the at least a portion of the value exceeds the at least a portion of the cost.

3. The method of claim 1, said creating further comprises: selecting an actual passenger name record from said global distribution system; and modifying the selected actual passenger name record into the fictitious passenger name record.

4. The method of claim 3, wherein said converting further comprises:
    canceling any portions of the selected actual passenger name record corresponding to used travel associated with the selected actual passenger name record; and
    setting said value based on unused travel associated with the selected actual passenger name record.

5. The method of claim 1, wherein said creating further comprises:
    selecting an actual passenger name record from said global distribution system; and
    generating the fictitious passenger name based at least partially on information from the selected actual passenger name record.

6. The method of claim 1, wherein said value is selected by a user to represent a gift amount.

7. The method of claim 1, wherein the value is selected by a carrier to represent compensation to a user.

8. The method of claim 1, wherein the fictitious passenger name record and the actual passenger name records have the same database format.

9. The method of claim 1, further comprising issuing a ticket based on the converted actual passenger name record.

10. A method for issuing vouchers, comprising:
    storing real travel records in a tangible computer readable medium portion of a database network, each travel record having associated therewith at least identification data and travel related data;
    creating, via software operating on an electronic computer hardware platform, a fictitious travel record that having associated therewith at least identification data, fictitious travel related data, and a value, said fictitious travel related data representing at least in part false travel arrangements that do not exist;
    storing the fictitious travel record in a tangible computer readable medium portion of the database network;
    receiving travel arrangements having a cost associated therewith;
    converting, via software operating on an electronic computer hardware platform, the fictitious passenger name record into an real travel record, said converting including at least crediting at least a portion of said value against at least a portion of the cost; and
    storing the converted real travel record in a tangible computer readable medium portion of the common database;
    wherein said fictitious travel record and said actual travel records have the same database format.

11. The method of claim 10, further comprising preventing said converting if the at least a portion of the value exceeds the at least a portion of the cost.

12. The method of claim 10, wherein said creating further comprises:
    selecting an actual personal travel record from said global distribution system; and modifying the selected actual personal travel record into the fictitious personal travel record.

13. The method of claim 10, wherein said converting further comprises:
canceling portions of the selected actual personal travel record corresponding to used travel associated with the selected actual personal travel record; and
setting said value based on unused travel associated with the selected actual personal travel record.

14. The method of claim 10, wherein said creating further comprises:
selecting an actual personal travel record from said global distribution system; and
generating the fictitious passenger name based at least partially on information from the selected actual personal travel record.

15. The method of claim 10, wherein said value is selected by a user to represent a gift amount.

16. The method of claim 10, wherein the value is selected by a carrier to represent compensation to a user.

17. The method of claim 10, wherein the fictitious personal travel record and the real travel records are accessible by the same on-line portal.

18. A method for issuing vouchers, comprising:
storing a plurality of actual passenger name records in a tangible computer readable medium portion of a global distribution system, each actual passenger name record having associated therewith at least identification data and travel related data;
creating, via software operating on an electronic computer hardware platform, a fictitious passenger name record having associated therewith at least identification data, fictitious travel related data, and a value, said fictitious travel related data representing at least in part false travel arrangements that do not exist;
designating said fictitious passenger name record as a redeemable asset; and
storing the fictitious passenger name record in a tangible computer readable medium portion of the global distribution system;
wherein the fictitious travel record has the same database format as the actual travel records.

19. The method of claim 18, wherein said creating further comprises:
selecting an actual passenger name record from said global distribution system; and
generating the fictitious passenger name based at least partially on information from the selected actual passenger name record.

20. The method of claim 18, wherein said value is selected by a user to represent a gift amount.

21. The method of claim 18, wherein the value is selected by a carrier to represent compensation to a user.

22. A method of redeeming a travel voucher, comprising:
retrieving a fictitious passenger name record from a tangible computer readable medium portion of a global distribution system, the fictitious passenger name record having associated therewith at least identification data, fictitious travel related data, and a value, said fictitious travel related data representing at least in part false travel arrangements that do not exist;
receiving travel arrangements having a cost associated therewith;
converting, via software operating on an electronic computer hardware platform, the fictitious passenger name record into an actual passenger name record, said converting including at least crediting at least a portion of said value against at least a portion of the cost; and
storing the converted actual passenger name record in a tangible computer readable medium portion of the global distribution system.

23. The method of claim 22, further comprising preventing said converting if the at least a portion of the value exceeds the at least a portion of the cost.

24. The method of claim 22, wherein said creating further comprises:
selecting an actual passenger name record from the global distribution system; and
modifying the selected actual passenger name record into the fictitious passenger name record.

25. The method of claim 22, wherein said converting further comprises:
canceling portions of the selected actual passenger name record corresponding to used travel associated with the selected actual passenger name record; and
setting said value based on unused travel associated with the selected actual passenger name record.

26. The method of claim 22, wherein said creating further comprises:
selecting an actual passenger name record from said global distribution system; and
generating the fictitious passenger name based at least partially on information from the selected actual passenger name record.

27. The method of claim 22, wherein said value is selected by a user to represent a gift amount.

28. The method of claim 22, wherein the value is selected by a carrier to represent compensation to a user.

29. The method of claim 22, wherein the fictitious passenger name record and the actual passenger name records have the same database format.

30. The method of claim 22, further comprising issuing a ticket based on the converted actual passenger name record.

* * * * *

UNITED STATES PATENT AND TRADEMARK OFFICE
CERTIFICATE OF CORRECTION

| | | |
|---|---|---|
| PATENT NO. | : 7,756,731 B2 | Page 1 of 1 |
| APPLICATION NO. | : 11/504047 | |
| DATED | : July 13, 2010 | |
| INVENTOR(S) | : Emmanuelle Pedron et al. | |

It is certified that error appears in the above-identified patent and that said Letters Patent is hereby corrected as shown below:

In claim 10, Col. 8, line 42, replace "having" with --has--.
In claim 10, Col. 8, line 52, replace "passenger name" with --travel--.
In claim 10, Col. 8, line 53, replace "an" with --a--.
In claim 10, Col. 8, line 57, replace "common database" with --database network--.
In claim 10, Col. 8, line 58, replace "actual" with --real--.
In claim 12, Col. 8, line 65, replace "an actual personal" with --a real--.
In claim 12, Col. 8, lines 65-66, replace "global distribution system" with --database network--.
In claim 12, Col. 9, line 1, replace "actual personal" with --real--.
In claim 13, Col. 9, line 5, replace "actual personal" with --real--.
In claim 13, Col. 9, line 7, replace "actual personal" with --real--.
In claim 13, Col. 9, line 9, replace "actual personal" with --real--.
In claim 14, Col. 9, line 12, replace "an actual personal" with --a real--.
In claim 14, Col. 9, lines 12-13, replace "global distribution system" with --database network--.
In claim 14, Col. 9, line 14, replace "the" with --a--.
In claim 14, Col. 9, lines 15-16, replace "actual personal" with --real--.
In claim 17, Col. 9, line 21, delete "personal".
In claim 18, Col. 9, line 41, replace "travel" with --passenger name--.
In claim 18, Col. 9, line 42, replace "travel" with --passenger name--.

Signed and Sealed this
Seventh Day of June, 2011

David J. Kappos
*Director of the United States Patent and Trademark Office*